(12) United States Patent
Barakat

(10) Patent No.: US 8,696,151 B1
(45) Date of Patent: Apr. 15, 2014

(54) MONITORING SHIPMENT OF BIOLOGICAL PRODUCTS TO DETERMINE REMAINING REFRIGERANT QUANTITY

(71) Applicant: Maurice Barakat, Short Hills, NJ (US)

(72) Inventor: Maurice Barakat, Short Hills, NJ (US)

(73) Assignee: TCP Reliable, Inc., Edison, NJ (US)

( * ) Notice: Subject to any disclaimer, the term of this patent is extended or adjusted under 35 U.S.C. 154(b) by 0 days.

(21) Appl. No.: 13/794,952

(22) Filed: Mar. 12, 2013

(51) Int. Cl.
*G01K 13/00* (2006.01)

(52) U.S. Cl.
USPC .............. 362/129; 62/126; 62/239; 62/457.9; 62/176.6; 236/51; 702/19

(58) Field of Classification Search
CPC . G01G 19/414; G06Q 50/28; G06Q 10/0832; G06Q 30/012; F25D 2303/082; F25D 2400/16; F25D 3/125; F25D 19/00; A01N 1/0252; B29C 65/8238; F28D 20/02; B65B 63/08
USPC .............. 62/126, 129, 239, 457.9, 176.6, 60; 236/51; 705/332; 702/19
See application file for complete search history.

(56) References Cited

U.S. PATENT DOCUMENTS

| | | | | |
|---|---|---|---|---|
| 2,467,268 A | * | 4/1949 | Merkle | 62/372 |
| 5,908,649 A | * | 6/1999 | Floyd et al. | 426/109 |
| 6,519,968 B1 | * | 2/2003 | Konarski | 62/371 |
| 6,536,189 B1 | * | 3/2003 | Murray | 53/440 |
| 7,130,771 B2 | * | 10/2006 | Aghassipour | 702/187 |
| 7,294,374 B2 | * | 11/2007 | Romero | 428/34.1 |
| 8,192,924 B1 | * | 6/2012 | Barakat et al. | 435/2 |
| 8,306,837 B2 | * | 11/2012 | Eager | 705/7.11 |
| 8,375,730 B2 | * | 2/2013 | Haarmann et al. | 62/60 |
| 2004/0243452 A1 | * | 12/2004 | Barton et al. | 705/7 |
| 2008/0197139 A1 | * | 8/2008 | Goncharko et al. | 220/592.25 |
| 2008/0291033 A1 | * | 11/2008 | Aghassipour | 340/584 |
| 2010/0169000 A1 | * | 7/2010 | Overgoor et al. | 701/204 |
| 2010/0185476 A1 | * | 7/2010 | Eager | 705/7 |
| 2010/0289669 A1 | | 11/2010 | Saltzman et al. | |
| 2010/0299278 A1 | * | 11/2010 | Kriss et al. | 705/332 |
| 2012/0027045 A1 | | 2/2012 | McLellan et al. | |
| 2012/0197810 A1 | * | 8/2012 | Haarmann et al. | 705/302 |
| 2012/0266564 A1 | * | 10/2012 | Haarmann et al. | 53/452 |
| 2012/0266610 A1 | * | 10/2012 | Lifson et al. | 62/56 |
| 2013/0080071 A1 | * | 3/2013 | Holmes | 702/21 |
| 2013/0245991 A1 | * | 9/2013 | Kriss | 702/150 |

* cited by examiner

*Primary Examiner* — Frantz Jules
*Assistant Examiner* — Martha Tadesse
(74) *Attorney, Agent, or Firm* — Eric P. Mirabel

(57) ABSTRACT

Disclosed is a process of determining, at a point during shipment, whether the solid phase refrigerant in a shipment is sufficient to preserve the shipment cargo, which is blood or other biological products, for the remaining shipment period, by: monitoring the temperatures encountered to said point and estimating the temperatures likely to be encountered during the remaining shipment period; determining the likelihood that the remaining refrigerant can maintain the shipment cargo within a specified temperature range during the remaining shipment period; and if the risk that the remaining refrigerant cannot maintain the shipment cargo within said range during the remaining shipment period is above a cut-off level, then taking action to preserve the value of the cargo.

17 Claims, 2 Drawing Sheets

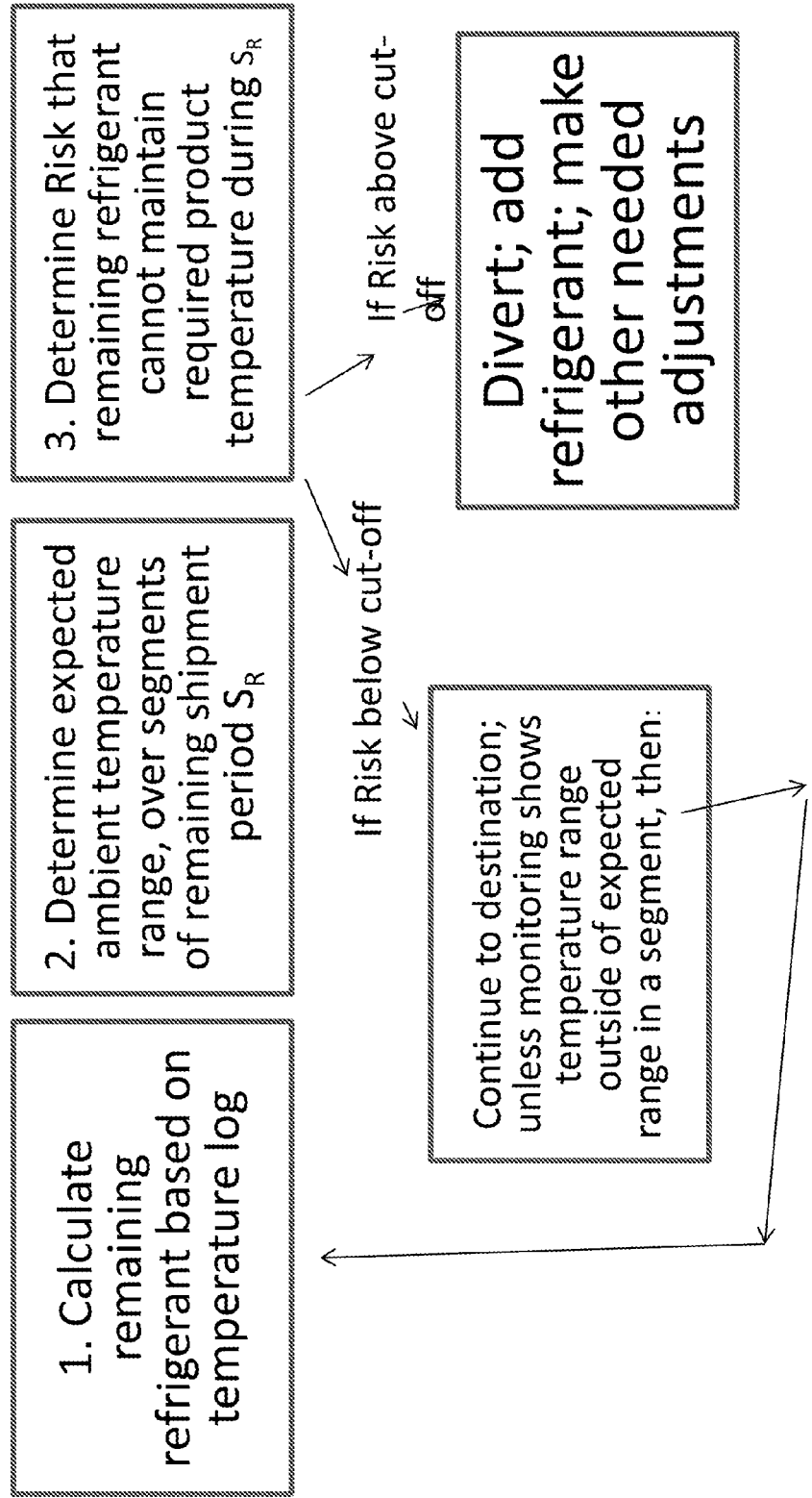

MONITORING SHIPMENT OF BIOLOGICAL PRODUCTS TO DETERMINE REMAINING REFRIGERANT QUANTITY

FIELD OF THE INVENTION

The invention relates to monitoring shipment of blood and other temperature-sensitive biological products.

BACKGROUND OF THE INVENTION

Shipment of blood and perishable biological materials is problematic because of the short effective life of these product, and their high value. In general, insulated containers in combination with temperature-control agents, such as refrigerant materials, are widely used as a cost-effective system to maintain the temperature of shipped products at selected temperature ranges, including refrigeration (2-8° C.); room temperature (20-30° C.); or frozen (below 0° C.). The temperature-control agents are generally phase change materials, ice, gel packs, or dry ice.

Phase change materials are materials which may be repeatedly converted between solid and liquid phases and utilize their latent heats of fusion to absorb, store and release energy to heat or cool during such phase conversions. In contrast to a material that absorbs and releases energy essentially uniformly over a broad temperature range, a phase change material absorbs and releases a large quantity in the vicinity of its melting/freezing point, thus facilitating temperature maintenance near the melting/freezing point.

Passive refrigerant systems utilizing insulated containers and phase change materials (and/or ice, gel packs, or dry ice) provide sufficient refrigeration for relatively short shipping periods, where, as an additional condition, the ambient temperature does not vary greatly from the internal temperature for extended periods. As shipment times are often longer than the period where ice in an insulated container will melt completely, refrigerant systems using combinations of phase change materials, gel packs and insulated containers are commonplace for shipment of temperature-sensitive products. See, e.g., U.S. Pat. Nos. 7,849,708 and 7,294,374 and US Publication No. 20120197810 (all of which are incorporated by reference). Other systems of insulated containers and phase change materials can be used to extend the time that products within are maintained at room temperatures or at temperatures below freezing (and the latter systems may also include ice or gel packs or dry ice, as appropriate), so as to match the shipment period and the shipment conditions (most importantly, the ambient temperature). See US Publication No. 20120197810.

One issue which has not been addressed is how to best retain the value of blood and other perishable products during shipment. Units of whole blood and red blood cells are kept refrigerated at (1-6° C.), with maximum permitted storage periods (shelf lives) of 35 and 42 days respectively. Platelets are typically pooled before transfusion and have a shelf life of five days—or three days, assuming it takes two days following collection to complete their testing. Platelets are stored at room temperature (22.2° C.) and must be rocked. If there are significant temperature excursions during shipment of blood and biological products, it renders these products unacceptable for medical uses and thus valueless.

Thus for shipping blood and biological products with passive refrigerant systems, sufficient refrigerant must always be present to maintain the required storage temperature. The ambient temperature significantly affects the conversion rate of the refrigerant, and thus the time blood and biological products can be in shipment before an unacceptable temperature excursion takes place.

Time in shipment can only be estimated, as there are many sources of delay during shipment, both conventional and unexpected. Also, the temperature during shipment can only be estimated based on expected weather conditions and knowledge of shipment mode internal temperatures and warehouse temperatures. If a shipment of blood or biological products is delayed, and/or the temperature varies beyond expectation during shipment, it is important to determine how much time is left before a sufficient quantity of the refrigerant is converted to cause an unacceptable temperature excursion.

SUMMARY

The invention relates to preservation of value in biological products and other perishable items, by allowing determination of the amount of refrigerant remaining, during shipping of the products. This is accomplished by monitoring of the shipping system temperature during shipment, and from that information and the characteristics of the shipping system, deriving the amount of refrigerant remaining. Then, the temperature (and preferably the humidity) to be encountered are predicted (from a database of logged shipments or from forecasts) and a determination is made of how long the remaining refrigerant can sustain the products within the required temperature range. The determination of how long the remaining refrigerant can so sustain the products depends on determining the relationship between the external predicted temperature and humidity, and the temperature within the shipping container which houses the product, which changes as more refrigerant is consumed. A larger temperature gradient will, of course, result in more rapid consumption of the refrigerant After the remaining refrigerant is determined, action can be taken, including moving the shipment to a faster transportation mode, instructing the shipper to add refrigerant, or diverting the shipment or moving the container (if it is in a warehouse) to a temperature-controlled environment (e.g., a refrigerated unit or a refrigerated cargo hold in a train, airplane or truck). The action taken might also be diverting the shipment to a nearby facility where the biological products can be used on site more immediately than originally planned. The monitoring and prediction described herein therefore allows one to take action to retain the value of biological products as the refrigerant level drops and shortens the effective life of the products.

In the invention, first a suitable container and refrigerant system for products requiring maintenance within a specified range of temperatures during shipment (including blood, blood products and other biological products, for example, cells, tissues, organs, microbes, microbial spores, yeast, plants and plant materials) is selected based on estimated shipping time and temperatures expected to be encountered during shipping. The process requires a prediction of the maximum period of shipment, and the predicted ambient temperature ranges and time of exposure thereto for the system during the maximum period of shipment. Alternatively, instead of predicting ambient temperature ranges for the system and time of exposure thereto, a postulated worst case scenario for ambient temperatures (winter and summer) and time of exposure thereto can be used. The lowest-cost system likely to accomplish the objective of preserving the cargo can be selected, as the monitoring of the shipment provides for taking corrective action if the system is likely to fail.

The "ambient temperature" of concern is the ambient temperature for the system—not the environmental ambient temperature. The ambient temperature for the system is the temperature inside the cargo area of the shipment mode (i.e., inside a truck-trailer, a train or an airplane cargo hold) or in a warehouse while in transit, as this temperature is what affects the conversion rate of the refrigerant. Of course, the environmental ambient temperature and humidity will affect the ambient temperature of the cargo area, unless the cargo area is actively temperature-controlled. The environmental ambient temperature and humidity will change as the system moves to its destination through environmental temperature fluctuations, thereby causing the ambient temperature in the cargo area to also fluctuate (again, unless it is temperature-controlled).

The system selected for shipping can include some combination of insulated container(s), phase change materials, and other temperature control agents such as ice, gel packs or dry ice. The selection can be done by an algorithm which, based on heat transfer characteristics of the system containers and melting characteristics of the temperature-control agents, derives a system which is likely able to maintain the product temperature within the required range under the predicted conditions for the shipment period.

Either experimentation, or derivation from the properties of the system components, can be used to establish a database for a variety of packaging and temperature-control systems. The database provides the length of time each member system in the database can maintain products within a specified range of temperatures, when the member system is exposed to specified ranges of ambient temperatures (and humidity) for specified time periods. The database may also provide historic information on environmental ambient temperature and humidity along different shipment routes, in different seasons. The database can be used in deriving the predicted temperatures ranges the system will be exposed to during shipment to a specified location over a predicted shipment period with a particular system, or these predicted ranges and exposure times can be entered by the operator. As noted, the system is to be monitored during shipment to ascertain the cargo ambient temperature and time of exposure thereto, and preferably, there is also monitoring of the system's internal temperature during shipment—in order to verify the predictions, supplement the database, and provide protection for the products in case of temperature excursions.

As noted above, an alternative to predicting ambient temperatures and the shipment period is to establish worst case scenarios—i.e., the predicted boundaries of the temperature range(s) in summer and winter, and the maximum predicted period of shipment/exposure based on destination and mode of shipment selected. Then, a system is selected which will maintain the products within the required temperature range under these conditions; and it will necessarily also do so under generally-encountered shipping conditions. Again, monitoring of the ambient and system internal temperatures during shipment can be used in conjunction with such predictions to ascertain whether the products remain in an acceptable temperature range during shipment.

With respect to shipment of blood from donors, for direct donation and/or for processing into blood products, currently, Fresenius HemoCare (Redmond, Wash., USA) offers two cooling and transport systems for blood bags: Compocool, and a more recent version, Compocool II™/Compocool WB™, in which the butane-1,4-diol cooling unit is placed in an insulated crate. Additionally, Sebra/Haemonetics (Tucson, Ariz., USA) offers butane-1,4-diol-filled transparent pouches (ThermaSure), developed for the transport of platelet concentrates and blood units at 22±2° C. One of more of these cooling and transport systems, or other suitable blood cooling and transport systems (including those in U.S. Pat. No. 8,192,924, and US Publication No. 2012-0266564, both incorporated by reference), can be the cooling system selected in the method described herein for shipping of blood bags. In such case, the cooling and transport system (with the blood bags) would be placed into an insulated container, which may have additional temperature control agents.

Blood, organs for donation and other biological products must stay within a confined temperature range to be suitable for recipients. The selection method and monitoring described herein is particularly well-suited to selection of systems for blood and blood product shipment. Following shipment, the products shipped are evaluated, assayed or tested following shipment to determine their donor compatibility or otherwise, their suitability for in vivo or medical use.

BRIEF DESCRIPTION OF THE DRAWINGS

FIG. 2 is a flow diagram showing the steps in determining whether the product being shipped needs to be diverted, have refrigerant added, or be moved to a refrigerated area, where the assumed temperature range over a plurality of segments of the remaining shipment period $T_R$ is determined then applied. Where continued monitoring shows temperature excursions over a segment, the determination needs to be repeated.

DETAILED DESCRIPTION

Figure 1:
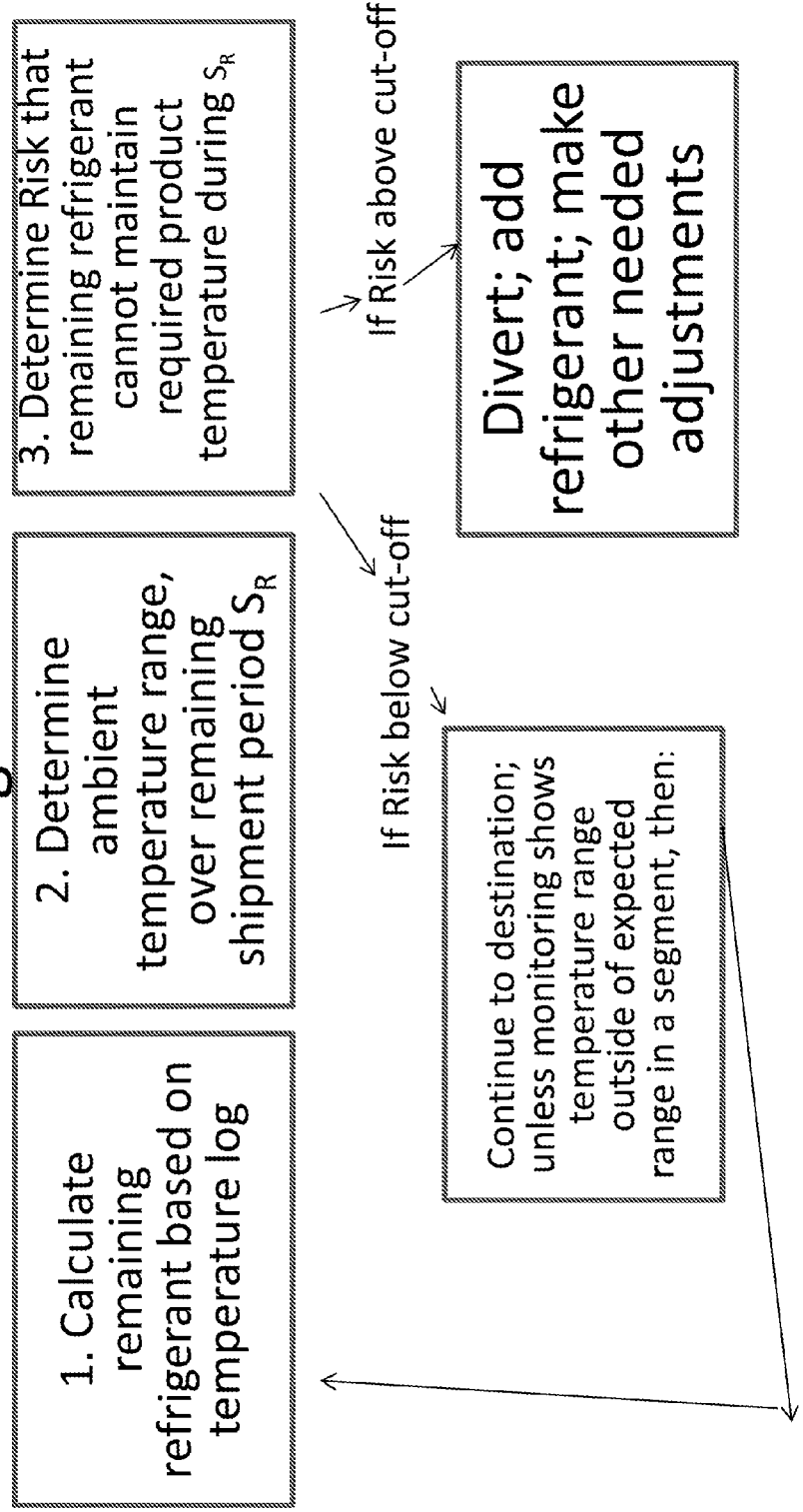
FIG. 1 is a flow diagram showing the steps in determining whether the product being shipped needs to be diverted, have refrigerant added, or be moved to a refrigerated area, where the assumed temperature range over the entire remaining shipment period $T_R$ is determined then applied. Where continued monitoring shows temperature excursions, the determination needs to be repeated.

Monitoring temperature during shipment can be done with one of several commercial systems, including the Escort iMini™, the REDi Wireless™, and the Wireless Mini™, all made by Escort Dataloggers, Inc. (Buchanan, Va.). Data from these monitors can be viewed and plotted using the ESCORT Chartreader™. For the real time monitoring suitable for use with the system herein, either the REDi Wireless™, and the Wireless Mini™ are suitable, as the data can be read or downloaded remotely.

In the invention, the temperature log is used to predict the amount of refrigerant remaining, and the prediction of remaining shipment time and temperature determines whether action needs to be taken to preserve the value of the cargo—i.e., if the refrigerant is predicted to be insufficient to maintain the required temperature of the cargo. Over the course of shipment, the ambient temperature (i.e., the temperature the shipping container experiences) varies over time. The simplest case to ensure that the packaging system selected for shipment will comply with the temperature range restrictions for the products it carries, is to assume the ambient temperature range can be at the highest ambient summer temperature or at the lowest ambient winter temperature for the entire shipment period. Monitoring of the temperature and humidity encountered during shipment allows verification of the predicted conditions and allows determining the amount of refrigerant remaining at selected points en route.

The first step in shipment is to select a suitable system. The system can be selected based on lowest cost likely to accomplish the objective, as the monitoring of the shipment permits taking corrective action if the system selected proves inadequate. At various points during shipment, a determination of whether the remaining refrigerant is adequate can be made based on projecting the simplest case scenario (where one assumes the temperature range during shipment is either the highest likely or the lowest likely temperature) over the entire remaining shipment period.

The simplest case scenario can be segmented to represent exposure times to different ambient temperature ranges likely to be encountered en route. The total of these ranges and exposure times represent the ranges encountered during the shipment period and/or the remaining shipment period. Segmenting in this manner provides a more reliable prediction of the temperatures to be encountered during shipment. Again, at selected points during shipment, one can apply the segmented scenario to the remaining shipment period (designated $S_R$ in FIGS. 1 and 2), to determine if the remaining refrigerant is sufficient to sustain the required temperature during $S_R$.

As an example of segmenting during $S_R$: the system may begin its journey in a truck trailer without temperature control, then move to a temperature-controlled warehouse, then back to an uncontrolled truck trailer to finish its journey to the destination. If $S_R$ is determined, for example, after the truck trailer leaves the cargo in the temperature-controlled warehouse (before the final leg of the trip), then if $s^{TT}$ is the time remaining for shipment on a truck trailer, and if $s^W$ is the time the cargo is to remain in the warehouse, then $S_R=s^{TT}+s^W$. The prediction of ambient temperature range would then only be applied during $s^{TT}$ in determining whether the remaining refrigerant could sustain the cargo, as the ambient temperature during $s^W$ would be known.

As experience (actual data) is collected to determine the actual range of the ambient temperatures encountered, and the time of exposure to different temperature ranges on different shipment routes during different seasons, the temperature model can be modified, so that instead of applying the expected summer and winter high and low temperature (based on publicly available information) across $S_R$, values summer and winter high and low temperatures closer to those likely to be experienced are substituted, and used with the expected times of exposure to these temperature ranges to determine remaining refrigerant over $S_R$. In the preceding scenario, during $s^{TT}$, if the temperature range applied in the model is based on experience rather than worst case, it will more reliably predict the amount of temperature-control agent likely to be consumed during $s^{TT}$.

The properties of shipment systems related to their ability to maintain the required inner temperature over the predicted ambient temperatures (especially heat transfer) are preferably tested or otherwise determined, and then the information is stored in a database. One testing method is to expose a series of systems to high temperatures and determine the melting time(s) for temperature-control agents inside. Another method of selecting systems is by derivation of expected temperature-control agent melting time(s) from the properties of the system's containers and temperature-control agents, at the predicted ambient temperature and time of exposure thereto.

In a preferred embodiment, during shipment, after monitoring the ambient temperatures and logging the results, a computer program runs an algorithm to determine the remaining effective life of the temperature control agent(s), based on the properties of the shipment system, the temperature control agents, the ambient temperatures experienced and the ambient temperatures expected. The properties of the shipment system and the temperature control agents include the heat transfer characteristics of different systems (i.e., the heat transfer characteristics of both the temperature control agents and the container(s) in a system), and also the melting characteristics of the temperature-control agents. During shipment, therefore, the algorithm derives melt times and inner temperatures of different systems, and displays whether the system in transit can maintain the required product temperature for the remaining shipment period at the expected temperatures. The situation where the remaining shipment period is segmented is shown in FIG. 2; and the non-segmented case is in FIG. 1.

The ambient temperature applied by the program can be the simplest case projection (a range from expected summer highs to winter low temperatures over the shipment route for the shipment period) or the segmented ranges and their respective times experienced. The ambient temperatures in the database can be updated and supplemented based on those actually experienced by systems, or, updated based on derived ambient temperatures resulting from the environmental ambient temperatures logged or predicted. The computer program can also indicate the standard deviations in temperatures and shipment times, along different points in the route. This can allow the operator logging the shipment remotely to determine the risk of unacceptable temperature excursions during the remainder of the shipment, and based on that calculation of risk, instruct action to preserve the cargo (as indicated in FIGS. 1 and 2).

A database of environmental temperatures along shipment routes (from which ambient temperature can be derived) can be established by compiling the historical temperature records for the route, or by actual monitoring, or by a combination of historical data and actual monitoring. In providing for the widest safety margin, one would determine the highest summer temperature ever and the lowest winter temperature, and then derive ambient expected temperature from those extremes.

On the other hand, if a shipper can warranty certain ranges of ambient temperatures for the remaining shipment period (i.e., climate controlled shipment and warehousing, from start to finish), there is no need to estimate the expected environmental ambient temperature. Where there is active monitoring of temperature and humidity as described herein, the key to preservation of the product shipped at a point during shipment is to ensure there will be no delays during the remaining shipment period—which the shipper may also warranty. If delays are expected, or if the shipper will not provide a warranty, action can be taken to preserve the cargo (as indicated in FIGS. 1 and 2).

As noted, the temperature and humidity data logged from shipments can be added to the database, which is preferably done automatically where the database is stored on a computer. As the database expands, the predictions of the temperature ranges during various segments of shipment along routes where more data has been accumulated should become more reliable and deviations should narrow. This allows more reliable determination of when action is needed to preserve the shipment.

The temperature, humidity (and optionally related conditions that may affect temperature-control agent melting like atmospheric pressure) should be collected at multiple points during shipment. These datapoints can be used to construct a cold chain map. The map is preferably plotted at different times of the year to form a series of season-specific cold chain maps. These season-specific cold-chain maps can be used to derive a more accurate prediction of the temperatures the system would be likely to experience during any particular shipment segment.

The data on temperature during shipment can be collected using datalogging devices which are analyzed after shipment, or are preferably collected with the devices described above which transmit temperature data to a monitoring station (using RF transmission) throughout shipment. Both types of devices are available from Escort Data Loggers, Inc., Buchanan, Va. Actual monitoring may be needed for customer assurance, or to meet the FDA GMP requirements, if the products are subject to FDA jurisdiction, for example, pharmaceuticals, biological products or blood products. The monitoring system may be designed to track and log the temperature automatically during shipment, if this is a requirement under applicable regulations. The temperature log can also be automatically documented, if this is a regulatory requirement or part of the standard operating procedures (SOPs) for regulated products.

A database also includes heat transfer characteristics of the system constituents, including the containers. The materials forming the containers are typically conventional materials used in fabricating portable coolers, e.g., expanded polystyrene or polyethylene, because of their insulating properties. The database also includes melting characteristics of a variety of phase-change materials and coolants which can be included in the packaging, as well as melting characteristics of a number of combinations of packaging and phase change materials and/or coolants. The algorithm used to determine whether the system can maintain the cargo for the remainder of the shipment period $S_R$, can display several alternative scenario based on expectations, and an operator can select one which best satisfies the needs in a particular case:

1. Determine if the system can meet the worst case temperature range for $S_R$ (FIG. 1).
2. Determine if the system can meet the time-segmented temperature ranges for $S_R$ (FIG. 2).
3. Determine if the system can meet the worst case or time-segmented temperature ranges for $S_R$, where the temperature ranges are based on historic data and/or weather forecasts for the shipping route.
4. Determine if the system can meet the worst case or time-segmented temperature ranges for $S_R$, where the temperature ranges are based on historic data and/or weather forecasts for the shipping route and/or on data collected during shipment on the route.
5. For systems meeting the criterion in any of scenarios 1 to 4 above, determine the risk of cargo destruction due to temperature excursions/refrigerant conversion for each scenario; and
6. Where risk is above a cut-off level (where the cut-off level is based on cargo value) take action to preserve cargo value. (FIGS. 1 and 2)

As noted in factor 6 above, the cut-off level for the risk level can be pre-set, and would be lower where cargo value was higher. The cut-off level could also be graded depending on the action to be taken, and its feasibility. For example, it may not possible to "add refrigerant" to the shipping system, in locations where no suitable refrigerant (typically a phase change material) is readily available. It may also not be possible to divert the shipment to have the cargo used within its remaining effective life. No proximate facility may be willing to purchase the cargo. Thus the action to be taken in such cases could only be "expedite shipment," which is likely the most costly alternative to preserve the cargo value. Such relative costs can be taken into account by setting the cut-off level. Of course if the cost of action is greater than the value of the cargo to be preserved, that can be built into the calculation as a limitation on further action. It is also possible to have communication with the customer about the course of action to be pursued, and to obtain their direct approval for any action to be taken. The different courses of action to preserve the cargo value and their costs can be programmed as an algorithm, and the lowest cost alternative can be determined by a computer.

Using the monitoring systems available from Escort Data Loggers, Inc. allows transmitting data regarding temperature, and also pressure, relative humidity, and $CO_2$ levels, using RF, other wireless modes or WiFi. A GPS system with the device allows locating the system at the time data is sent/received. Alarms which can be monitored indicate temperature excursions, and are preferred where maintaining product temperature is critical; i.e., for blood or other biological products. The data transmitted by the sensors is recorded and preserved on a database, which is preferably web-accessible. As noted, this monitoring system can be used to verify or refute predicted temperatures, to establish or supplement a cold chain map along different shipment routes, and most importantly, to establish the effective amount of the remaining refrigerant and determine if it will be effective over the expected remaining shipment time.

An issue related to preservation of refrigerant is the initial selection of a shipment system. In that regard, US Publication No. 2012-0197810 A1 is incorporated by reference. This application describes an algorithm for selection of a shipment system where expected temperatures, shipment duration and cost are considerations in selection. As noted, the preservation of the refrigerant is directly related to the heat transfer properties of the shipment system, and generally, more costly systems are better insulated and preserve refrigerant for longer periods (under the same conditions).

Preferred refrigerants are dry ice, ice, frozen gel packs or phase change material. Preferred phase change materials are 1-dodecanol and 1-decanol, and a particularly preferred combination has 98% 1-dodecanol, 1.5% myristyl alcohol and 0.5% 1-decanol, as disclosed in U.S. Pat. No. 8,192,924 (incorporated by reference).

In a preferred method, both system selection and monitoring of the shipment can be performed from a remote location. In one modification of the method, the customer can perform the selection and/or monitoring functions themselves, and then decide themselves whether to take action to preserve the shipment while it is en route (i.e., they can decide whether to move the shipment to a faster transportation mode, instruct the shipper to add refrigerant, or divert the shipment or move the system to a temperature-controlled environment).

To make a selection of an appropriate system, one may also need to monitor and establish the effect the ambient temperature has on the ice, gel packs or phase change material in each type of container which can be part of a system, over time. Alternatively, such effect can be derived from the heat transfer characteristics of the packaging and the melting time of the ice, gel packs or phase change material, and not verified by actual monitoring. A monitoring system which includes an alarm system for temperature excursions, can alert the shipper or recipient that the phase change material or ice may be melted and needs to be checked. Again, action can be taken if needed or if the risk level of cargo damage is too high.

Segmenting the time of exposure to environmental ambient temperatures is particularly appropriate in cases where the ambient temperatures are unregulated during shipment, like in a truck trailer, but where the system spends a substantial part of the trip in a temperature-controlled environment (warehouse or temperature-controlled cargo hold). Segmenting in these cases helps protect against the effect of exposure to the unregulated ambient temperatures, but helps avoid over-compensating for the temperature extreme(s) during this exposure, and changing system requirements or taking action where there is no need to.

The containers for the system can be any of a number of designs and materials, including expanded polystyrene and polyethylene. Containers can also be multi-layered, one inside another, with one such arrangement shown in U.S. Pat. No. 7,849,708 (incorporated by reference), wherein an inner container includes a phase change material and the product, and an outer container includes gel packs. Various combinations of containers, gel packs, ice, dry ice and phase change materials are readily apparent to one skilled in the art. For example, one could have multiple containers layered within each other, with layers of different temperature-control agents in different quantities in different containers.

Phase change materials are relatively expensive, and thus one seeks to minimize their use, and substitute ice, gel packs, dry ice or container designs which add insulation, where feasible. Phase change materials are not consumed in the cooling process, and can be re-frozen and used again. But a practical difficulty in re-use may be that the customer will not return the phase change material they receive—meaning it must be expensed with the rest of the system, which the customer would usually retain.

The real-time shipment monitoring disclosed herein allows selection of slower, lower-cost shipment options. The cost of the faster shipment options can be balanced against the likelihood that the system can maintain the product for the time required under slower shipment modes. Shipment cost may be lower when using slower shipment with monitoring, to protect the cargo even with such slow shipment.

At some point following arrival of blood/biological materials at the end-user destination, the materials would be tested to determine their suitability for use in patients or as reagents in assays or otherwise tested to determine their suitability for the purpose they were requested by the end-user. The effect of shipment on the products might be determined soon after arrival, or, their suitability for use in patients or as reagents may be tested well after arrival. In either case, a biological assay is performed on the products, which can be one or more of: an antibody-mediated assay including an enzyme-linked immunosorbent assay (See e.g., U.S. Pat. No. 8,021,850, incorporated by reference), a nucleic acid hybridization assay (See e.g., U.S. Pat. No. 8,036,835, incorporated by reference), an elongation-mediated chain terminating assay (U.S. Pat. No. 6,972,174 incorporated by reference), an elongation-mediated assay or a ligation assay (U.S. Pat. No. 7,262,032, incorporated by reference), a cell-based assay (U.S. Pat. No. 7,655,421, incorporated by reference) or a viability, blood-typing or tissue-type matching assay, including but not limited to an HLA-typing or a serological assay The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A process of determining, at a point during shipment, whether the solid phase-change material refrigerant 1-dodecanol in a shipment, which changes from solid phase to liquid phase during shipment but not to gas phase, is sufficient to preserve the shipment cargo, which is blood or other biological products, for the remaining shipment period to the intended recipient, comprising:
    shipping blood or other biological products with the solid phase-change material and an on board monitor which monitors and records the temperature throughout the shipment period;
    determining the temperatures encountered to said point by the shipment using the on board monitor;
    calculating the amount of the solid phase of the 1-dodecanol remaining at said point based on the temperatures encountered;
    segmenting the remaining shipment period into a plurality of segments and determining the expected ambient temperature range during all said segments;
    calculating a value representing the likelihood that the remaining 1-dodecanol can maintain the shipment cargo within a specified temperature range during the remaining shipment period, based on the expected ambient temperature range during all said segments; and
    if the likelihood that the remaining 1-dodecanol can maintain the shipment cargo within said specified temperature range during the remaining shipment period is below a cut-off level, then taking action to preserve the value of the cargo, which is one of: adding refrigerant to the shipment, moving the shipment to a faster transportation mode, moving the shipment to a temperature-controlled environment, or diverting the shipment to a different recipient.

2. The process of claim 1 wherein the action is adding refrigerant to the shipment, moving the shipment to a faster transportation mode, moving the shipment to a temperature-controlled environment, or diverting the shipment to a different recipient.

3. The process of claim 1 wherein the temperature-controlled environment is a refrigeration unit or a refrigerated cargo hold in a train, airplane or truck.

4. The process of claim 1 further including establishing a database for a plurality of temperature-control systems, each system including containers for the solid phase refrigerant, wherein the database can be used to determine the length of time each member system can maintain products housed in the containers with the refrigerant within a specified range of temperatures when the shipment is exposed to specified ranges of ambient temperatures for specified time periods, and wherein the specified ranges and time periods represent, respectively, the predicted ambient temperature ranges and times of exposure thereto for the shipment during the shipment period.

5. The process of claim 1 further including testing the blood or biological products using a biological assay, which may be one or more of: an antibody-mediated assay; a nucleic acid assay; a cell-based assay; or a blood-typing or tissue-typing assay wherein, in the course of the assay, there is one or more of: nucleic acid hybridization, nucleic acid chain elongation, antibody-protein binding, or protein-protein binding.

6. The process of claim 4 wherein the database is established on a computer.

7. The process of claim 4 wherein the database is established by deriving, from the characteristics of the containers and the refrigerants, the length of time each temperature-control system can maintain products housed in the containers with the specified refrigerants within a specified range of temperatures when the temperature-control system is exposed to specified ranges of ambient temperatures for specified time periods.

8. The process of claim 1 further including a GPS system to allow location of the shipment en route.

9. The process of claim 8 wherein the location and monitoring of temperatures can be performed from a remote location through a web-based system allowing computer access.

10. The process of claim 1 wherein the estimating of the temperatures likely to be encountered during the remaining shipment period is by determining the lowest ambient temperature likely to be experienced by the shipment to the highest.

11. The process of claim 1 wherein the estimating of the temperatures likely to be encountered during the remaining shipment period is based on historic ambient temperature data for the predicted shipping route.

12. The process of claim 10 wherein ambient temperature is monitored during shipment and alerts indicate excursions from the predicted ambient temperature range.

13. The process of claim 10 wherein the relative humidity, pressure and $CO_2$ is also monitored during shipment.

14. The process of claim 2 wherein the cost of different actions is determined.

15. A process of ensuring low cost shipment of biological products requiring temperature-control, comprising:
   determining the maximum predicted period of shipment for a biological product and the predicted ambient temperature ranges during shipment;
   selecting the lowest-cost system of containers and solid phase refrigerants, which change from solid phase to liquid phase during shipment but not to gas phase, likely to maintain the biological products within a specified range of temperatures during the shipment period;
   shipping the products in the selected system and monitoring the temperatures encountered to a certain point during the shipment period using an on board monitor which monitors and records the temperature throughout the shipment period;
   calculating the amount of the solid phase of the refrigerant remaining at said point during the shipment period based on the temperatures encountered segmenting the remaining shipment period into a plurality of segments and determining the expected ambient temperature range during all said segments;
   calculating a value, at said point during shipment, representing the likelihood that the remaining un-melted solid phase refrigerant is sufficient to preserve the biological products, for the remaining shipment period, based on the expected ambient temperature range during said remaining shipment period; and
   if the likelihood that the remaining refrigerant can maintain the shipment cargo within said specified temperature range during the remaining shipment period is below a cut-off level, then taking action to preserve the value of the cargo, which is one of: adding refrigerant to the shipment, moving the shipment to a faster transportation mode, moving the shipment to a temperature-controlled environment, or diverting the shipment to a different recipient.

16. The process of claim 15 further including testing the biological product using a biological assay, which may be one or more of: an antibody-mediated assay; a nucleic acid assay; a cell-based assay; or a blood-typing or tissue-typing assay wherein, in the course of the assay, there is one or more of: nucleic acid hybridization, nucleic acid chain elongation, antibody-protein binding, or protein-protein binding.

17. The process of claim 15 further including a GPS system to allow location of the shipment en route.

* * * * *